Patented Sept. 3, 1946

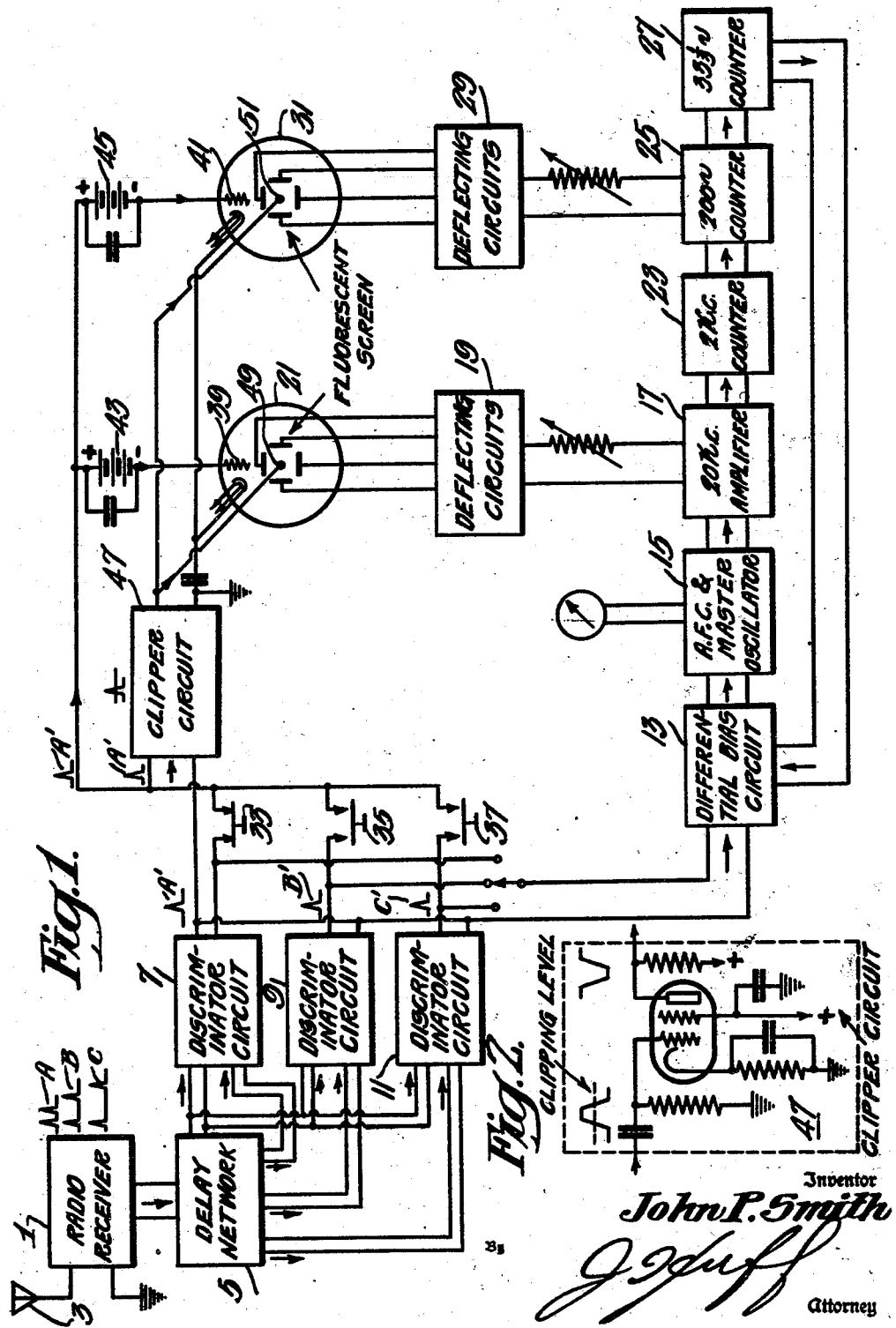

2,406,970

UNITED STATES PATENT OFFICE 2,406,970

RADIO PULSE INDICATOR

John P. Smith, Erlton, N. J., assignor to Radio Corporation of America, a corporation of Delaware Application November 29, 1941, Serial No. 420,919

6 Claims. (Cl. 315—24)

This invention relates to improvements in radio pulse indicators, and particularly to a cathode ray timing indicator in which the timing ray moves at a high angular rate compared to the repetition rate of the pulses to be timed.

In the copending applications Serial No. 420,944 filed November 24, 1941, by Wolff and Holmes, and Serial No. 420,928 filed by Holmes and Smith, on November 29, 1941, radio pulse position indicating systems are described. In such systems, pairs of spaced pulses are radiated in predetermined time relation from transmitters at known positions. The differences in the times required for the several pairs of pulses to travel from the transmitters to the receiver at an unknown position may be used to fix the point of reception with respect to the known positions. If the distances from the transmitter to the receivers are of the order of several hundreds of miles, it is necessary to use a pulse repetition rate which is low enough to permit the first pulse to travel the maximum range before the next pulse starts. At the same time, if high accuracy is desired, it is necessary to provide a relatively high timing rate in the indicator so that the indications of received signals will be spread out and differences in time of signal arrival of a microsecond or less will be indicated. By way of example, the repetition rate of a pair of pulses may be 33⅓ per second which corresponds to a maximum range of over 5000 miles, and the timing rate may be of the order of 200 rotations per second for the main indicator, 2,000 rotations per second for the first vernier and 20,000 rotations per second for the second vernier, if decade scales are desired. Other timing ratios may be used; for example, the main and vernier timers may bear a ratio of 1 to 100. At even the slowest rate, the cathode ray timing beam will rotate 200 times for one radial deflection effected by the received signal. The timing beam will leave such a bright trace that it will be difficult to distinguish the radial traces due to the received signals. The difficulty increases with the faster timing traces.

This difficulty is solved, as described in the cited Holmes and Smith application, by employing a manually operated blanking or signal selecting system in which the timing trace is blanked out for all but a brief period including the radial signal deflection. According to one of the objects of the instant invention, means are provided for the automatic selection of the portions of the timing trace or traces which include the radial deflection signal. Another object is to provide means for blanking automatically a cathode ray timing trace for all but the portion including the received signal. Another object is to provide means in a pulse receiver and indicator whereby any one of a plurality of signals may be selected while undesired signals may be blanked, thus to increase the signal-to-noise ratio and the visibility of the desired signals.

The invention will be described by referring to the accompanying drawing, in which Figure 1 is a schematic diagram of one embodiment of the invention, and Figure 2 is a diagram of a clipper circuit employed in the invention.

Referring to the drawing, the input of a pulse receiver 1 is connected to an antenna 3; the receiver output is connected to a delay network 5. The received signals are passed through the delay network and hence to one branch of the input circuits of three discriminators 7, 9 and 11. The other branches of the input circuits of the discriminator circuits are connected to portions of the required time delay of the network 5 so that spaced pulses A, B and C may be coincidentally applied to the discriminators. Thus selectively delayed, the pairs of pulses appear in the output of the respective discriminators as single pulses A′, B′ and C′. One of the single pulses is applied to a differential bias circuit 13 which is used for synchronizing and stabilizing the frequency of a master oscillator 15 as hereinafter described. The master oscillator includes a reactor thermionic tube or its equivalent for controlling the phase and frequency of the local oscillations. The local oscillations may have a frequency of 20 kilocycles per second, or any rate of the order of the angular velocity of the vernier timing device.

The local oscillations are applied through an amplifier 17 to a deflecting circuit 19 which includes a phase splitter. The phase splitter provides currents of quarature phase for deflecting the ray of the vernier indicator cathode ray tube 21. The amplifier output is applied through three frequency counters or frequency dividers 23, 25, 27. The intermediate counter 25 provides currents of 200 cycles per second, which are applied to a second deflecting circuit 29. The second deflecting circuit 29 includes a phase splitter whose output is applied to the deflecting electrodes of the main cathode ray tube 31 to rotate its ray at one one-hundredth of the rotational rate of the timing ray of the vernier indicator 21.

The output from any one of the discriminators 7, 9, 11 may be selected by push buttons 33, 35, 37 and applied to the grids 39, 41 of the vernier and main indicators 21, 31. Biasing means such as batteries 43, 45 are included in the grid circuits, so that the rays may be normally biased off their respective fluorescent screens. The selected discriminator output is also applied to a clipper circuit 47 and hence in the proper phase to the radial deflecting electrodes 49, 51 of the cathode ray indicators 21 and 31.

The local master oscillator 15 may be synchronized by selecting the single pulses derived preferably from the first received pair of pulses and by applying the selected pulse to the differential bias circuit 13. The output of the final counter 27 is also applied to the differential bias circuit. In this arrangement, the output of the differential bias circuit is zero or constant, provided the phase of the pulses and local current is constant. If the phase or frequency changes, the differential bias circuit output changes. The changing output current provides the control potential for the reactance device which synchronizes and stabilizes the master oscillator. Thus the master oscillator is locked to the incoming signals.

In the operation of the device, it should be understood that single pulses may be used instead of pairs of pulses by omitting the delay network 5 and discriminator circuits 7, 9 and 11. In either event, the beam of the main cathode ray tube 31 is driven at a relatively slow speed and the beam of the vernier tube 21 is driven at a relatively high speed. Both beams are rotated in synchronism with the local master oscillator currents and in phase with the incoming pulse signals. The rotating beams are biased off their respective fluorescent screens by the steady grid biases 43 and 45. When any one of the push buttons 33, 35 and 37 is operated to apply the incoming pulse signals to the grids 39 and 41, the steady bias is overcome momentarily and the rotating beams are applied to their respective screens. At the same time, the incoming pulse signals are applied to the clipper or pulse shortening circuit, which may be a clipper or limiter tube (see Figure 2). The limiter picks off the upper and narrower portion of the pulses A', B' or C' and applies the selected peak to the radial deflecting electrodes 49 and 51 to deflect the beams radially. The signal deflection occurs during the short interval when the beams are biased onto the screens, and thus the arcuate and radial traces are of substantially the same brilliance.

I claim as my invention:

1. A pulse indicator including a cathode ray tube having a fluorescent screen, a grid electrode, a radial deflecting electrode, and a source of cathode rays, means for sweeping said rays at a predetermined timing rate, means for blanking said rays off said screen, means for applying pulses to be indicated to said grid electrode to overcome said blanking means and to apply said rays to said screen, and means for applying said pulses to said radial deflecting electrode simultaneously with said application of said pulses to said grid electrode to deflect said ray radially on said screen.

2. A pulse indicator including a cathode ray tube having a fluorescent screen, deflecting elements, a grid electrode, a radial deflecting electrode and a cathode ray source, means including said deflecting elements for sweeping said ray at a predetermined timing rate, means including said grid electrode for blanking said ray off said screen, a source of pulses to be timed, means for applying said pulses to said grid electrode to apply said ray to said screen, and means for applying said pulses to said radial deflecting electrode simultaneously with said application of said pulses to said grid electrode to deflect said ray radially on said screen.

3. A pulse indicator including a cathode ray tube having a fluorescent screen, a radial deflecting electrode, a grid electrode and a cathode ray source, means for rotating said cathode ray at a predetermined timing rate, means including said grid electrode for blanking said ray off said screen, a source of pulses to be indicated, means for applying said pulses to said grid electrode to overcome said blanking means and to apply said ray to said screen, and means for applying said pulses to said radial deflecting electrode simultaneously with said application of said pulses to said grid electrode to deflect said ray radially on said screen.

4. An indicator for timing pulses including a cathode ray tube having a fluorescent screen, a grid electrode, a radial deflecting electrode, and a source of cathode rays, means for sweeping said rays at a predetermined timing rate, means for blanking said rays off said screen, means for applying said pulses to said grid electrode to overcome said blanking means and to apply said rays to said screen, means for shortening and for shaping said pulses, and means for applying said shortened and shaped pulses to said radial deflecting electrode simultaneously with said application of said pulses to said grid electrode to deflect said ray radially on said screen.

5. An indicator for timing pulses including a cathode ray tube having a fluorescent screen, deflecting elements, a grid electrode, a radial deflecting electrode and a cathode ray source, means including said deflecting elements for sweeping said ray at a predetermined timing rate, means for blanking said ray off said screen, a source of pulses to be timed, means for applying said pulses to said grid electrode to apply said ray to said screen, means connected to said pulse source for shortening said pulses, and means for applying said shortened pulses to said radial deflecting electrode simultaneously with said application of said pulses to said grid electrode to deflect said ray radially on said screen.

6. An indicator for timing pulses including a cathode ray tube having a fluorescent screen, a radial deflecting electrode, a grid electrode and a cathode ray source, means for rotating said cathode ray at a predetermined timing rate, means for blanking said ray off said screen, a source of pulses to be timed, means for applying said pulses to said grid electrode to overcome said blanking means and to apply said ray to said screen, means connected to said source for shortening said pulses, and means for applying said shortened pulses to said radial deflecting electrode to deflect said ray radially on said screen during the application of said pulses to said grid electrode.

JOHN P. SMITH.